United States Patent Office 3,320,268
Patented May 16, 1967

3,320,268
1-AROYL OR HETEROAROYL-7-AZAINDOLE-3-CARBOXYLATES AND DERIVATIVES
Tsung-Ying Shen, Westfield, and Glen E. Arth, Cranford, N.J., assignors to Merck & Co., Inc., Rahway, N.J., a corporation of New Jersey
No Drawing. Filed Aug. 14, 1964, Ser. No. 389,804
5 Claims. (Cl. 260—295)

This invention relates to new azaindole compounds. More specifically, it relates to azaindoles wherein the aza function is substituted at the 4, 5, 6, or 7 position. More particularly, it relates to substituted azaindole 3-acetic acids, esters, and non-toxic salts having an aromatic carboxylic acyl (aroyl or heteroaroyl) radical of less than three fused rings attached to the N-1 nitrogen. Still more specifically, it relates to 7-azaindole compounds of the formula:

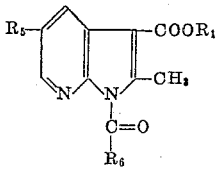

wherein:

$R_1$ may be hydrogen, lower alkyl, or substituted lower alkyl, such as diethylaminoethyl and aralkyl;
$R_5$ may be hydrogen, lower alkoxy, aralkyloxy, or dimethylamino; and
$R_6$ may be an aromatic radical of less than three fused rings of more than four and less than seven atoms to the ring, in which rings any heteroatoms present are selected from the group consisting of oxygen, nitrogen, and sulfur, there being from zero to three such heteroatoms present in no more than one of said rings and in which aromatic radicals any substituents other than hydrogen are selected from the group consisting of halogen, lower alkyl, lower alkylthio, lower alkoxy, trifluoromethyl, phenoxy, lower alkylphenoxy, lower alkoxyphenoxy, halogenophenoxy, trifluoroacetyl, difluoroacetyl, monofluoroacetyl, di(lower alkyl sulfamyl, lower alkanol, di(lower alkyl)carboxamido cyano, carb-lower alkoxy, aldehydo, trifluoromethylthio, lower alkylsulfinyl, lower alkylsulfonyl, benzylthio, lower alkylbenzylthio, lower alkoxybenzylthio, halogenobenzylthio, mercapto, nitro, amino, di(lower alkyl)amino, lower alkylamino, lower alkanoylamino, hydroxy, lower alkanoyloxy, trifluoroacetoxy, difluoroacetoxy, benzyloxy, lower alkylbenzyloxy, lower alkoxybenzyloxy, and halogenobenzyloxy.

In the preferred compounds of this invention, the $R_1$ group may be hydrogen or lower alkyl, especially hydrogen or ethyl; the $R_5$ group may be lower alkoxy and dimethylamino, especially methoxy; and the $R_6$ group is a substituted phenyl radical wherein the substituent may be halo, alkylthio, trifluoromethyl, alkoxy, and the like.

The azaindole acetic acid compounds substituted in the N-1 position by an aroyl or heteroaroyl group possess varying degress of antiinflammatory, analgesic, and antipyretic activities. For these purposes, the compounds of this invention are normally administered orally in tablets or capsules, the optimum dosage depending on the particular compound used and the type and severity of condition being treated. Oral dosage levels of the preferred compounds in the range of 1–2000 mg. per day are useful in control of such conditions. The compounds may be admixed with the usual pharmaceutically acceptable carriers in the preparation of tablets or capsules. They can also be administered as ointments or the like for topical use.

The starting materials for the preparation of the compounds of this invention may be represented as follows:

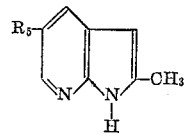

wherein $R_5$ is as previously defined. These starting materials may be prepared by a variety of procedures, depending upon the substituent desired on the $R_5$ group. As, for example, when $R_5$ is dimethylamino and therefore the desired starting material is 2-methyl-5-dimethylamino-7-azaindole hydrochloride, 2-methyl-7-azaindole may be hydrogenated with Raney nickel at elevated temperatures to produce 2-methyl-7-azaindoline. This compound is then nitrated with fuming nitric acid to obtain the corresponding 2 - methyl-5-nitro-7-azaindoline. This indoline compound is then acylated, for example, by treating with benzoic anhydride in an inert solvent at elevated temperatures to form 1 - benzoyl-2-methyl-5-nitro-7-azaindoline. The compound thus obtained is then reductively alkylated with Raney nickel in glacial acetic acid and formaldehyde to obtain the 1-benzoyl-5-dimethylamino-7-azaindoline. The compound is subsequently dehydrogenated with palladium on carbon and deacylated to obtain the corresponding 2-methyl-5-dimethylamino-7-azaindole hydrochloride starting material.

To obtain compounds in which $R_5$ is lower alkoxy or aralkyloxy, the 2-methyl-7-azaindoline obtained as described above is refluxed in a mixture of pyridine, benzene, and acetic anhydride to yield the 1-acetyl-2-methyl-7-azaindoline. This compound may then be reacted with peracetic acid at slightly elevated temperatures, the mixture concentrated to dryness and further reacted with acetic anhydride and water to obtain 2-methyl-7-azaindoline-5-ol-1,5-diacetate. A mixture of this diacetate, methanol, and sodium methoxide is then reacted at room temperature and the mixture subsequently neutralized to obtain 1-acetyl-2-methyl-7-azaindoline-5-ol. The corresponding 5-methoxy (low alkoxy) compound is obtained by reacting the 5-ol compound with sodium hydride in benzene followed by the addition of a lower alkyl halide, such as methyl iodide, and the mixture allowed to react for several hours to obtain 1-acetyl-2-methyl-5-methoxy-7-azaindoline. Finally, this indoline compound is dehydrogenated and subsequently treated with hydrochloric acid (to remove the 1-acetyl) to obtain the 2-methyl-5-methoxy azaindole starting material. Alternatively, the 1-acetyl-2-methyl-7-azaindoline-5-ol indicated above may be reacted with a compound such as phenyldiazomethane to obtain 1-acetyl-2-methyl-5-benzyloxy-7-azaindoline, which compound may then be dehydrogenated and treated with acid to obtain 2-methyl-5-hydroxy-7-azaindole. This compound is then reacted with phenyldiazomethane to obtain the 2 - methyl-5-benzyloxy-7-azaindole compound starting material.

Beginning with these starting materials, the subject compounds of this invention may be prepared as illustrated by the following flow sheet:

FLOW SHEET I.—PREPARATION OF COMPOUNDS OF THIS INVENTION

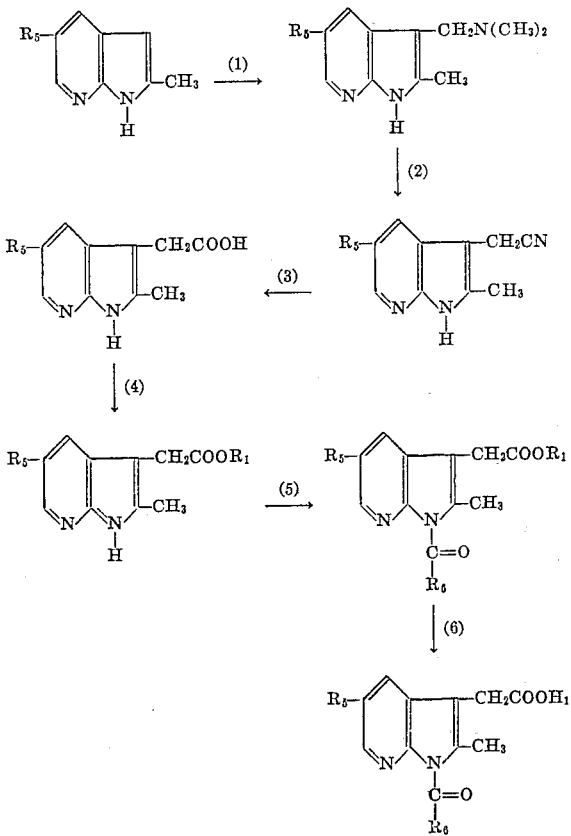

*Equivalents:*
$R_1$, $R_5$, and $R_6$ are as previously defined.
*Reactions and conditions:*

*Step 1.*—Reaction in an inert solvent with dimethylamine hydrochloride and paraformaldehyde at elevated temperatures until the reaction is substantially complete.

*Step 2.*—Reaction with an alkali cyanide, such as sodium cyanide, potassium cyanide, and the like, preferably sodium cyanide in water, aqueous alcohol or DMF (preferably water) with a small amount of a mineral acid (preferably hydrochloric acid) at elevated temperatures until the reaction is substantially complete.

*Step 3.*—Reaction with a concentrated hydrohalic acid, such as hydrochloric acid, at elevated temperatures until the reaction is substantially complete.

*Step 4.*—Reaction with a lower alkanol (methanol, ethanol, t-butyl alcohol, and the like) or ar-lower alkanol (benzyl alcohol, phenylethanol, and the like), and concentrated sulfuric acid at elevated temperatures until the reaction is substantially complete; or when the t-lower alkyl ester is desired, reaction in methylene chloride with concentrated sulfuric acid and a 1,1,2-trilower alkyl ethylene, preferably isobutylene, at any suitable temperature (preferably ambient temperatures) until the reaction is substantially complete.

*Step 5.*—Reaction with a mixed anhydride of an aroic acid or heteroaroic acid and a strong inorganic acid or a mixed anhydride of an aroic acid or heteroaroic acid and an organic acid or an ester of an aroic acid and o- and/or p-nitrophenol or a heteroaroic acid and o- and/or p-nitrophenol (preferably an aroic acid halide or the p-nitrophenyl ester of an aroic acid) in a suitable solvent (such as dimethylformamide, benzene, toluene— dimethylformamide preferred) in the presence of a strongly basic condensing agent (such as sodium hydride and potassium hydride—sodium hydride preferred) at any effective combination of temperature and time (preferably room temperature for 1 hour).

*Step 6.*—Pyrolysis (used when the ester is a t-lower alkyl ester, e.g., t-butyl) by heating until the lower alkene begins to evolve and maintaining the temperature of evolution until pyrolysis is complete. It is preferred to use the t-butyl ester for pyrolysis, heating this compound under nitrogen in the presence of porous glass chips (or in the presence of a catalytic amount of a strong organic or inorganic acid, such as p-toluenesulfonic acid) until isobutylene is substantially evolved.

The non-toxic acid addition salts of the free acids obtained from Step 6 are still other compounds within the scope of this invention and may be prepared by any known methods, e.g., treating the azaindole acid in an inert solvent with an equivalent amount of inorganic or organic base. The inorganic bases contemplated are those of the alkali and alkali earth metals, such as sodium, potassium, strontium, and the like. Typical organic bases are lower alkylamines, such as ethylamine, dipropylamine, and the like.

Esters and amides may be prepared, for example, by the use of carbodiimides as condensing agents with the corresponding alcohols or amines and the parent azaindole carboxylic acids which are the subject of this invention. Other methods of esterification well known in the art are also possible.

Step 1 is carried out in an inert solvent, such as lower alkanols (ethanol, n-butanol, propanol, and the like), n-butanol preferred. The reaction may be carried out at temperatures at or near reflux (reflux temperature preferred).

The reaction of Step 3 is carried out at or near the reflux temperature of the system using a concentrated hydrohalic acid, preferably hydrochloric acid, at the reflux temperature of the system.

Step 4 may be carried out by any known means used for esterification. It is preferred to carry out the esterification with a small amount of concentrated acid, preferably 1–3% concentrated sulfuric acid. The alcohol is generally used as the solvent also. However, inert solvents may be used a'so. Subsequently, when it is desired to obtain the acid from the ester formed in this step, the esterification is carried out with a 1,1,2-trilower alkyl ethylene, as previously indicated. Although it is not essential that the acid formed from Step 3 be isolated prior to this esterification step, it is highly preferred that isolation of the acid is carried out. The isolation may be accomplished by concentrating the reaction product obtained from Step 3 to dryness. This residue may then be dissolved in an aqueous solution of sodium bicarbonate, the solution filtered, and the filtrate cautiously acidified with an acid and concentrated in vacuo to obtain a crystalline product.

Step 6 may be carried out at temperatures between 150–250° C. However, it is preferred to use a catalytic surface, such as glass or porous plate chips (preferably the latter) so that pyrolysis may be effectively carried out at lower temperatures.

The following examples are given by way of illustration:

EXAMPLE 1

*2-methyl-7-azaindoline*

To a solution of 0.7 mole of 2-methyl-7-azaindole in 180 ml. of decalin in a bomb is added 10% of a freshly prepared Raney nickel catalyst. The bomb is placed under 90 atmospheres of hydrogen pressure and slowly warmed to 165° C. The temperature is gradually brought to 200° C. and maintained at this point during 4 hours. The catalyst is separated by filtration and the filtrate distilled in vacuo. The distillate, on standing, crystallizes and the solids are then recrystallized from petroleum ether to yield 2-methyl-7-azaindoline.

EXAMPLE 2

2-methyl-5-nitro-7-azaindoline

To a solution of 0.1 mole of 2-methyl-7-azaindoline in 20 ml. of concentrated sulfuric acid, maintained with efficient stirring at −5° C., is added over a one-hour period a mixture of 11 g. of fuming nitric acid (d. 1.5) and 10 ml. of concentrated sulfuric acid. The mixture is stirred at −5° C. for an additional 2 hours, after which it is poured into 120 g. of ice and neutralized with cooling by the addition of 6 N ammonium hydroxide. The mixture is filtered and the cake washed thoroughly with water and air-dried. A slurry of 16.5 g. of this cake in 5 ml. of water and 15 ml. of concentrated sulfuric acid is added over a 25-minute period to 50 ml. of concentrated sulfuric acid (efficiently stirred at −10° C. to −15° C.). The reaction mixture is then allowed to warm to room temperature overnight, at which time it is added to 400 g. of ice. The resulting solution is treated with charcoal, following which the crude product is precipitated by the addition of excess concentrated sulfuric acid (external cooling). The crude product is collected by filtration and the wet cake is dissolved in ethyl acetate and washed with 5% NaOH until the washings are only slightly colored. After washing thoroughly with water, the solution is dried with anhydrous sodium sulfate and evaporated in vacuo. The crude product, 2-methyl-5-nitro-7-azaindoline, is purified by chromatography on silica gel.

EXAMPLE 3

1-benzoyl-2-methyl-5-nitro-7-azaindoline

To a mixture of 0.1 mole of 2-methyl-5-nitro-7-azaindoline, 45 g. of benzoic anhydride, and 1 liter of benzene is added 0.1 ml. of concentrated sulfuric acid. The mixture is then heated at reflux for 6 hours, after which the benzene is distilled in vacuo. The residue is dissolved in ethyl acetate and shaken thoroughly with excess aqueous sodium carbonate. The mixture is occasionally shaken over a two-hour period, after which the aqueous layer is separated and discarded. The ethyl acetate solution is washed thoroughly with water and dried. The solvent is evaporated, initially, in vacuo until crystallization occurs. The mixture is then cooled until crystallization is complete. The solid, 1-benzoyl-2-methyl-5-nitro-7-azaindoline, is collected by filtration, rinsed once with ethyl acetate, and dried.

EXAMPLE 4

1-benzoyl-2-methyl-5-dimethylamino-7-azaindoline

A suspension of (0.001 mole) 1-benzoyl-2-methyl-5-nitro-7-azaindoline, 2 ml. of glacial acetic acid, 2 ml. of 37% formaldehyde, 100 ml. of ether, and 3 g. of Raney nickel is hydrogenated at room temperature and 40 p.s.i. When the uptake of hydrogen has halted, the catalyst is separated by filtration and the filtrate is evaporated to afford the crude 1-benzoyl-2-methyl-5-dimethylamino-7-azaindoline, which is purified by chromatography on silica gel.

EXAMPLE 5

2-methyl-5-dimethylamino-7-azaindole hydrochloride

A mixture of (2.20 g.) 1-benzoyl-2-methyl-5-dimethylamino-7-azaindoline (1.3 g.) 5% palladium on carbon, and (24 g. Dowtherm is heated at reflux for 3 hours under nitrogen. After cooling, the catalyst is separated by filtration and washed with benzene. The filtrate is extracted with (5×60 ml.) 5% aqueous hydrochloric acid. The acid extracts are combined and neutralized with concentrated ammonium hydroxide (external cooling). The resulting solution is evaporated in vacuo leaving an oily residue, which is then repeatedly extracted with hot ethyl acetate. The solvent is evaporated in vacuo leaving an oily residue, which is hydrolyzed with 100 ml. of 5% hydrochloric acid on the steam bath for 1.5 hours. The cooled solution is neutralized with concentrated ammonium hydroxide (external cooling). The oil which separated is extracted into ethyl acetate. The extract is washed twice with small portions of water, dried over sodium sulfate, and evaporated to about ⅓ volume. A solution of dry hydrochloric acid in ether is added to the ethyl acetate solution until neutralization is complete. The mixture is then evaporated at atmospheric pressure until crystalline 2-methyl-5-dimethylamino-7-azaindole hydrochloride separates. The product is separated by filtration, washed with ether, and dried.

EXAMPLE 6

1-carbethoxy-2-methyl-7-azaindoline

A solution of 0.1 mole of 2-methyl-7-azaindoline in 120 ml. of benzene is azeotropically dried and then cooled to room temperature. 9.0 ml. of pyridine is then added followed by the addition of a solution of 12.0 g. of ethyl chloroformate in 110 ml. of azeotropically dried benzene (with stirring over a one-hour period). The mixture is heated at reflux for 5 hours and then filtered while hot. The precipitate is then washed with dry ether. The filtrate and washings are taken to dryness in vacuo until all of the pyridine is removed. The concentrated solution is then washed several times with water, dried, and evaporated to about 100 cc. and adsorbed on silica gel. The product, 1-carbethoxy-2-methyl-7-azaindoline, is eluted with a mixture of ether-petroleum ether.

EXAMPLE 7

2-methyl-7-azaindoline-7-oxide

A stirred mixture of 0.5 mole of 1-carbethoxy-2-methyl-7-azaindoline and 13.6 ml. of 40% peracetic acid is warmed to about 60° C. initiating an exothermic reaction which is controlled at 50–65° C. by external cooling or heating as needed to keep the temperature near 65° C. for a five-hour period. The entire reaction mixture is then evaporated at <40° C. in vacuo. 50 ml. of water is added and the mixture is again evaporated as before. To the residue is added 55 ml. of 10% aqueous sodium hydroxide and the mixture is then heated at reflux for 1 hour. After cooling to room temperature, the reaction mixture is neutralized with glacial acetic acid and the resulting mixture evaporated to dryness in vacuo at <40° C. The residue is partitioned between water and ethyl acetate, the latter solution being washed once with water, dried, and finally evaporated at atmospheric pressure until crystalline 2-methyl-7-azaindoline-7-oxide begins to separate. The mixture is then cooled to complete the crystallization. The mixture is filtered and the cake washed with 50% ethyl acetate-50% petroleum ether and dried.

EXAMPLE 8

2-methyl-7-azaindoline-5-ol-1,5-diacetate 4.4 ml. of water is added to 48.8 g. of acetic anhydride. After reaction has occurred, the acetic anhydride-water mixture is charged with 0.56 mole of 2-methyl-7-azaindoline-7-oxide and the resulting solution is kept at room temperature for 16 hours. The solution is then refluxed for 5 hours and the solvents evaporated in vacuo at <40° C. The residue is then partitioned between ether and 160 ml. of cold 5% hydrochloric acid followed by extraction with an additional 160 ml. of cold 5% hydrochloric acid. The cold 5% hydrochloric acid solution is neutralized with solid sodium bicarbonate and exhaustively extracted with ether. The ethereal solution is washed once with water, dried, and evaporated in vacuo to an oil which crystalizes from petroleum ether. Substantially pure 2-methyl-7-azaindoline-5-ol-1,5-diacetate is obtained by recrystallizing this product from petroleum ether.

EXAMPLE 9

1-acetyl-2-methyl-7-azaindoline-5-ol

To a stirred solution of 0.001 mole of 2-methyl-7-azaindoline-5-ol-1,5-diacetate in 5 ml. of dry methanol under a blanket of nitrogen is added 1 ml. of a one molar methanolic sodium methoxide solution and the resulting mixture is stirred at room temperature for 10 minutes. At this point, the mixture is neutralized with 0.06 ml. of glacial acetic acid. 5 ml. water is added and the resulting mixture is evaporated in vacuo to dryness. The residue is partitioned between ethyl acetate and water. The ethyl acetate layer is washed once with water, dried and evaporated to about 3 ml. Addition of petroleum-ether causes the separation of crystalline 1-acetyl-2-methyl-7-azaindoline-5-ol.

EXAMPLE 10

1-acetyl-2-methyl-5-methoxy-7-azaindoline

To a stirred solution of 0.001 mole of 1-acetyl-2-methyl-7-azaindoline-5-ol in 5 ml. of dry benzene is added 50 mg. of sodium hydride (50% suspension in oil). The mixture is stirred at room temperature in an atmosphere of dry nitrogen until all of the sodium hydride reacts. 0.2 ml. of methyl iodide is then added and the reaction flask is stoppered and stirred at room temperature for 6 hours. The reaction mixture is then diluted with benzene and washed with water. The solvents are evaporated in vacuo leaving an oil which is crystallized from an ether-petroleum ether mixture. Recrystallization from the same solvents affords substantially pure 1-acetyl-2-methyl-5-methoxy-7-azaindoline.

EXAMPLE 11

2-methyl-5-methoxy-7-azaindole

A mixture of 1.15 grams of 1-acetyl-2-methyl-5-methoxy-7-azaindoline, 5% palladium on carbon (0.6 g.) and Dowtherm (24 g.) is heated at reflux for 3 hours in a dry nitrogen atmosphere. After cooling to room temperature, the catalyst is separated by filtration and rinsed with benzene. The combined washings and filtrate are extracted with (5×30 ml.) portions of cold 5% hydrochloric acid. The aqueous layer is neutralized (with external cooling) with ammonium hydroxide and evaporated in vacuo to dryness at <40° C. The residue is partitioned between water and ethyl acetate and the layers are separated. The aqueous layer is reextracted with ethyl acetate. The combined ethyl acetate extracts are taken to dryness in vacuo at <40° C. The residue is then heated in 5 cc. of 5% hydrochloric acid on the steam bath for 40 minutes to remove the 1-acetyl group. After cooling, the reaction mixture is neutralized with ammonium hydroxide and the product is extracted into ethyl acetate, which, after washing and drying, is evaporated, leaving crude 2-methyl-5-methoxy-7-azaindole, which is crystallized from ether-petroleum ether.

EXAMPLE 12

1-acetyl-2-methyl-5-benzyloxy-7-azaindoline

To a solution of 0.1 mole of 1-acetyl-2-methyl-7-azaindoline-5-ol in 200 ml. of ethyl acetate at room temperature is added ethereal phenyldiazomethane at such a rate that most of the phenyldiazomethane is consumed before another charge is added. After adding a 5% excess of phenyldiazomethane, the reaction mixture is allowed to stand at room temperature overnight. The solvents are then removed in vacuo and the residue placed in benzene. The solution is then chromatographed on silica gel using ether-petroleum ether as the eluent. The product thus obtained is recrystallized from petroleum ether-ether mixtures.

EXAMPLE 13

2-methyl-5-hydroxy-7-azaindole

A mixture of 1.0 gram of 1-acetyl-2-methyl-5-benzyloxy-7-azaindoline, 5% palladium on carbon, and Dowtherm in 100 ml. of methanol is heated at reflux for 3 hours in a dry nitrogen atmosphere. After cooling to room temperature, the catalyst is separated by filtration and rinsed with benzene. The combined washings and filtrate are extracted with (5×30 ml.) portions of cold 5% hydrochloric acid. The aqueous layer is neutralized (with external cooling) with ammonium hydroxide and evaporated in vacuo to dryness at <40° C. The residue is partitioned between water and ethyl acetate and the layers are separated. The aqueous layer is reextracted with ethyl acetate. The combined ethyl acetate extracts are taken to dryness in vacuo at <40° C. The residue is then heated in 5 cc. of 5% hydrochloric acid on the steam bath for 40 minutes to remove the 1-acetyl group. After cooling, the reaction mixture is neutralized with ammonium hydroxide and the product is extracted into ethyl acetate, which, after washing and drying, is evaporated, leaving crude 2-methyl-5-hydroxy-7-azaindole, which is crystallized from ether-petroleum ether.

EXAMPLE 14

2-methyl-5-benzyloxy-7-azaindole

To a solution of 0.1 mole of 2-methyl-5-hydroxy-7-azaindole in 200 ml. of ethyl acetate at room temperature is added ethereal phenyldiazomethane at such a rate that most of the phenyldiazomethane is consumed before another charge is added. After adding a 5% excess of phenyldiazomethane, the reaction mixture is allowed to stand at room temperature overnight. The solvents are then removed in vacuo and the residue placed in benzene. The solution is then chromatographed on silica gel using ether-petroleum ether as the eluent. The product thus obtained is recrystallized from petroleum ether-ether mixtures.

EXAMPLE 15

2-methyl-7-azagramine

A mixture of 40 ml. of N-butyl alcohol, 0.01 mole of 2-methyl-7-azaindole, 0.88 g. of dimethylamine hydrochloride and 0.33 g. of paraformaldehyde is heated at reflux for 30 minutes. The solution is then evaporated to dryness in vacuo, leaving a residue to which is added 10 ml. of water and 1 ml. of concentrated hydrochloric acid. Neutral materials are than extracted (from the acidic aqueous solution) with ethyl acetate, which is then made basic with potassium carbonate. The precipitated material is collected by filtration, washed with ether and dried.

When 2-methyl-5-dimethylamino-7-azaindole hydrochloride, 2-methyl-5-methoxy-7-azaindole, and 2-methyl-5-benzyloxy-7-azaindole are used in place of 2-methyl-7-azaindole in the above example, there are obtained the corresponding 2-methyl-5-dimethylamino-7-azagramine, 2-methyl-5-methoxy-7-azagramine, and 2-methyl-5-benzyloxy-7-azagramine respectively.

In the cause of the 2-methyl-5-dimethylamino-7-azagramine, the crude residue obtained from the above example is dissolved in 20 ml. of ethyl acetate and neutralized with a solution of dry hydrochloric acid in ether to form the dihydrochloride. The solution is then slowly evaporated at atmospheric pressure until crystalline-2-methyl-5-dimethylamino-7-azagramine dihydrochloride separates. The solution is then cooled until crystallization is complete, filtered, and the cake washed with ether to yield the 2-methyl-5-dimethylamino-7-azagramine dihydrochloride.

EXAMPLE 16

2-methyl-7-azaindole-3-acetonitrile

A mixture of 0.03 mole of 2-methyl-7-azagramine, 14.8 g. of sodium cyanide, and 1500 ml. of water is treated with 2.5 ml. of concentrated hydrochloric acid and heated at reflux for 64 hours. After cooling, 50 g. of potassium carbonate is added to the reaction mixture, after which the reaction mixture is cooled again. The resulting solid is collected by filtration, washed with water, and dried. The product, substantially pure 2-methyl-7-azaindole-3-acetonitrile, is further purified by recrystallization from benzene-petroleum ether.

When 2-methyl-5-dimethylamino-7-azagramine dihydrochloride, 2-methyl-5 - methoxy - 7 - azagramine, and 2-methyl-5-benzyloxy-7-azagramine are used in the above example in place of 2-methyl-7-azagramine, there are obtained 2 - methyl - 5 - dimethylamino - 7 - azaindole - 3 - acetonitrile, 2-methyl-5-methoxy-7-azaindole - 3 - acetonitrile, and 2-methyl-5-benzyloxy-7-azaindole - 3 - acetonitrile respectively.

In the case of the 2-methyl-5-dimethylamino-7-azaindole-3-acetonitrile, the crude product obtained from the above example is dissolved in 20 ml. of ethyl acetate and neutralized with a solution of dry hydrochloric acid in ether to form the hydrochloride. The solution is then slowly evaporated at atmospheric pressure until crystalline 2 - methyl - 5 - dimethylamino - 7 - azaindole - 3 - acetonitrile hydrochloride separates. The solution is then cooled until crystallization is complete, filtered, and the cake washed with ether to yield the 2-methyl-5-dimethylamino-7-azaindole-3-acetonitrile hydrochloride.

EXAMPLE 17

*2-methyl-7-azaindole-3-acetic acid*

A mixture of 0.005 mole of 2-methyl-7-azaindole-3-acetonitrile and 20 ml. of concentrated hydrochloric acid is refluxed for 6 hours. The solution is then concentrated to dryness in vacuo. The residue is dissolved in a solution of an excess of sodium bicarbonate in 10 ml. of water and the solution filtered. The filtrate is acidified with acetic acid and concentrated in vacuo until the product precipitates. The concentrate is then filtered and the cake dried. The cake is then recrystallized from ethanol-water to yield 2-methyl-7-azaindole-3-acetic acid.

When 2 - methyl - 5 - dimethylamino - 7 - azaindole - 3 - acetonitrile hydrochloride, 2-methyl-5-methoxy-7-azaindole-3-acetonitrile, and 2-methyl-5-benzyloxy-7-azaindole-3-acetonitrile are used in the above example in place of 2-methyl-7-azaindole-3-acetonitrile, there are obtained 2-methyl - 5 - dimethylamino - 7 - azaindole - 3 - acetic acid, 2-methyl-5-methoxy- 7 - azaindole - 3 - acetic acid, and 2-methyl-5-benzyloxy-7-azaindole-3-acetic acid respectively.

In the case of the 5-dimethylamino compound, the product is exhaustively extracted from the acetic solution with ethyl acetate.

EXAMPLE 18

*t-butyl-2-methyl-7-azaindole-3-acetate*

To a mixture of 450 ml. of methylene chloride, 1.0 ml. of concentrated sulfuric acid, and 22.1 grams of 2-methyl-7-azaindole-3-acetic acid is slowly added 30 grams of isobutylene. The mixture is stirred for 7 hours at room temperature, after which the reaction mixture is filtered. The filtrate is then poured into 150 ml. of cold water containing 4.2 grams of sodium carbonate. The separated organic layer is washed with 1-N aqueous sodium carbonate, dried, filtered, and concentrated in vacuo to a syrup. The t - butyl - 2 - methyl - 7 - azaindole - 3 - acetate crystallizes from this syrup by triturating with petroleum ether.

When 2 - methyl - 5 - dimethylamino - 7 azaindole - 3 - acetic acid, 2-methyl-5-methoxy-7-azaindole-3-acetic acid, and 2-methyl-5-benzyloxy-7-azaindole-3-acetic acid are used in the above example in place of 2-methyl-7-azaindole-3-acetic acid, there are obtained the corresponding t-butyl esters.

In the case of the 5-dimethylamino compound, 5.0 ml. of concentrated sulfuric acid is used in the above example.

In the case of the t-butyl-2-methyl-5-dimethyl-amino-7-azaindole-3-acetate, the crude syrup obtained from the above example is dissolved in 20 ml. of ethyl acetate and neutralized with a solution of dry hydrochloric acid in ether to form the hydrochloride. The solution is then slowly evaporated at atmospheric pressure until crystalline t-butyl-2-methyl - 5 - dimethylamino - 7 - azaindole-3-acetate hydrochloride separates. The solution is then cooled until crystallization is complete, filtered, and the cake washed with ether to yield the t-butyl-2-methyl-5-dimethylamino-7-azaindole-3-acetate hydrochloride.

EXAMPLE 19

*methyl 2-methyl-7-azaindole-3-acetate*

A mixture of 0.01 mole of 2-methyl-7-azaindole-3-acetic acid, 8 ml. of concentrated sulfuric acid, and 250 ml. of anhydrous methanol is refluxed for 5 hours. The solution is then concentrated in vacuo to approximately ⅓ the volume. 80 ml. of water is added and the mixture extracted with (3×50 ml.) ether. The combined ether extracts are washed with saturated potassium bicarbonate solution and water. The ether solution is then dried over sodium sulfate, filtered, and concentrated to a residue. The residue is then chromatographed on a silica gel column (wt./wt. 50:1 gram crude) using an ether-petroleum ether system (v./v. 20–60%) as eluent to obtain methyl 2-methyl-7-azaindole-3-acetate.

When 2-methyl-5-dimethylamino-7-azaindole-3 - acetic acid, and 2-methyl-5-methoxy-7-azaindole-3-acetic acid, and 2-methyl-5-benzyloxy - 7 - azaindole - 3 - acetic acid are used in the above example in place of 2-methyl-7-azaindole-3-acetic acid, there are obtained the corresponding methyl esters.

Similarly, when ethanol, butanol, benzyl alcohol, dimethylaminoethanol, and phenylethanol are used in the above example in place of methanol, there are obtained the corresponding ethyl, butyl, benzyl, dimethylaminoethyl, and phenylethyl esters.

EXAMPLE 20

*t-butyl-1-p-chlorobenzoyl-2-methyl-7-azaindole-3-acetate*

A solution of 0.02 mole of t-butyl-2-methyl-7-azaindole-3-acetate in 25 ml. of dimethylformamide is added dropwise to a cold suspension of 0.022 mole of sodium hydride in 25 ml. of dimethylformamide. This mixture is stirred at room temperature for ½ hour, cooled in an ice bath, and treated with 0.022 mole of p-chlorobenzoyl chloride. The reaction mixture is stirred at room temperature for 16 hours and subsequently poured into 260 ml. of ice water. The aqueous mixture is then extracted with (3×200 ml.) ether. The combined ether extract is then washed with 100 ml. of potassium bicarbonate solution followed by (3×100 ml.) water. The ether layer is dried over sodium sulfate and concentrated in vacuo to yield t-butyl-1-p-chlorobenzoyl-2-methyl-7-azaindole-3-acetate.

When t - butyl - 2 - methyl - 5 - dimethylamino - 7-azaindole - 3 - acetate, t - butyl - 2 - methyl - 5 - methoxy-7 - azaindole - 3 - acetate, and t - butyl - 2 - methyl - 5-benzyloxy-7-azaindole-3 - acetate are used in place of t-butyl-2-methyl-7-azaindole-3-acetate in the above example, there are obtained the corresponding 1-p-chlorobenzoyl compounds.

In the case of the t-butyl-1-p-chlorobenzoyl-2-methyl-5-dimethylamino-7-azaindole-3-acetate, the crude product obtained from the above example is dissolved in 20 ml. of ethyl acetate and neutralized with a solution of dry hydrochloric acid in ether to form the hydrochloride. The solution is then slowly evaporated at atmospheric pressure until crystalline t-butyl-1 - p-chlorobenzoyl - 2-methyl-5-dimethylamino -7 - azaindole-3 - acetate hydrochloride separates. The solution is then cooled until crystalization is complete, filtered, and the cake washed with ether to yield the t-butyl-1-p-chlorobenzoyl - 2-methyl-5-dimethyl-amino-7-azaindole - 3 - acetate hydrochloride.

Similarly, when 3,4,5 - trimethoxybenzoyl chloride, p - trifluoroacetylbenzoyl chloride, p - N,N - dimethylsulfamyl-benzoyl chloride, p-difluoroacetylbenzoic acid, p- carbomethoxybenzoyl chloride, p-formylbenzoyl chloride, p-trifluoromethylthiobenzoyl chloride, N,N-dimethyl-p-sulfonamidobenzoyl chloride, p-methylsulfinylbenzoyl chloride, p-methylsulfonylbenzoyl chloride, p-benzythiobenzoyl chloride, p-nitrophenyl nicotinate, p-dimethylaminobenzoyl chloride, p-acetaminobenzoyl chloride, o-fluoro-p-chlorobenzoyl chloride, o-methoxy-p-chlorobenzoyl chloride, 2,4,5-trichlorobenzoyl chloride, 2-thenoyl chloride, 3-thenoyl chloride, 4-thiazole carbonyl chloride, 5-chloro-2-furoyl chloride, and 5-methyl-4-oxazole carbonyl chloride are used in place of p-chlorobenzoyl chloride in the above example, there are obtained the corresponding t-butyl-1-acyl-2-methyl-7-azaindole-3-acetates.

Similarly, when the methyl ester of 2-methyl-7-azaindole - 3 - acetic acid, 2 - methyl - 5 - dimethylamino - 7-azaindole-3-acetic acid hydrochloride, 2-methyl-5-methoxy - 7 - azaindole - 3 - acetic acid, 2 - methyl-5-benzyloxy-7-azaindole-3-acetic acid, and the ethyl, butyl, benzyl, dimethylamino-ethyl, and phenylethyl esters of 2-methyl-7-azaindole-3-acetic acid obtained from Example 19 are used in place of t-butyl-2-methyl-7-azaindole-3-acetate in the above example, there are obtained the corresponding methyl, ethyl, butyl, benzyl, dimethylaminoethyl, and phenylethyl 1-p-chlorobenzoyl esters.

EXAMPLE 21

*1-p-chlorobenzoyl-2-methyl-7-azaindole-3-acetic acid*

A mixture of 1.0 gram of t-butyl-1-p-chlorobenzoyl-2-methyl-7-azaindole-3-acetate and 0.1 gram of powdered porous plate is heated slowly in an oil bath under an atmosphere of nitrogen until isobutylene starts to escape. Stirring is initiated and the temperature held constant for ca. 1 hour. After cooling under nitrogen, the product is dissolved in benzene and ether, filtered, and extracted with bicarbonate. The aqueous solution is filtered to remove the ether, neutralized with acetic acid, and then acidified weakly with dilute hydrochloric acid. The crude 1-p-chlorobenzoyl-2-methyl-7-azaindole - 3 - acetic acid is recrystallized from aqueous ethanol and dried in vacuo.

When t-butyl-1-p-chlorobenzoyl-2-methyl-5 - dimethylamino-7-azaindole-3-acetate, t-butyl-1-p-chlorobenzoyl-2-methyl-5-methoxy-7-azaindole-3-acetate, t-butyl-1-p-chlorobenzoyl-2-methyl-5-benzyloxy-7-azaindole-3 acetate, and the t-butyl-1-acyl-2-methyl-7 - azaindole - 3 - acetates obtained from Example 20 are used in place of t-butyl-1-p-chlorobenzoyl-2-methyl-7-azaindole-3-acetate in the above example, there are obtained the corresponding free acids.

In the case of the 1-p-chlorobenzoyl-2-methyl-5-dimethylamino-7-azaindole-3-acetic acid, the crude product obtained from the above example is dissolved in 20 ml. of ethyl acetate and neutralized with a solution of dry hydrochloric acid in ether to form the hydrochloride. The solution is then slowly evaporated at atmospheric pressure until crystalline 1-p-chlorobenzoyl-2-methyl - 5-dimethylamino-7-azaindole - 3 - acetic acid hydrochloride separates. The solution is then cooled until crystallization is complete, filtered, and the cake washed with ether to yield the 1-p-chlorobenzoyl-2-methyl-5-dimethylamino-7-azaindole-3-acetic acid hydrochloride.

What is claimed is:
1. A compound of the formula:

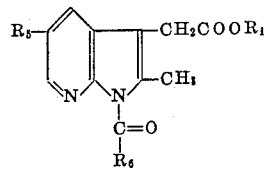

wherein:

$R_1$ is selected from the group consisting of hydrogen, lower alkyl, substituted lower alkyl, and ar-lower alkyl;

$R_5$ is selected from the group consisting of hydrogen, lower alkoxy, arylalkyloxy, and dimethylamino;

$R_6$ is selected from the group consisting of phenyl, pyridyl, 2-thienyl, 3-thienyl, 4-thiazolyl, 5-halo-2-furyl, 5-lower alkyl-4-oxazolyl and substituted phenyl wherein the substituent is selected from the group consisting of halo, lower alkoxy, trifluoroacetyl, difluoroacetyl, di(lower alkyl)sulfamyl, lower alkanoyl, carb-lower alkoxy, trifluoromethylthio, lower alkyl sulfinyl, lower alkyl sulfonyl, benzylthio, di(lower alkyl)amino, lower alkanoyl amino and di(lower alkyl)sulfonamido.

2. A compound of claim 1 wherein $R_1$ is hydrogen, $R_5$ is lower alkoxy, and $R_6$ is p-chlorophenyl.

3. A compound of claim 1 wherein $R_1$ is lower alkyl, $R_5$ is lower alkoxy, and $R_6$ is p-chlorophenyl.

4. 1-p-chlorobenzoyl-2-methyl-5-methoxy-7 - azaindole-3-acetic acid.

5. Methyl-1-p-chlorobenzoyl-2-methyl-5 - methoxy - 7-azaindole-3-acetate.

References Cited by the Examiner

UNITED STATES PATENTS

| | | | |
|---|---|---|---|
| 1,790,521 | 1/1931 | Davis et al. | 260—297 |
| 3,055,934 | 9/1962 | Heisler et al. | 260—497 |

OTHER REFERENCES

Degering: Organic Nitrogen Compounds, p. 212, University Litho printers (1945).

Elderfield: Heterocyclic Compounds, vol. 3, Wiley (1952), p. 53.

Fieser et al.: Advanced Organic Chemistry, Reinhold 1961, pp. 365 and 372.

Shriner et al.: Identification of Organic Compounds, Wiley 3rd ed., pp. 234, and 237 (1948).

Snyder et al.: J. Am. Chem. Soc., vol. 70 (1948), pp. 1857–60.

JOHN D. RANDOLPH, *Primary Examiner.*

WALTER A. MODANCE, *Examiner.*

ALAN L. ROTMAN, *Assistant Examiner.*